E. A. L. BOURDELLES.
AUTOMATIC FIREARM.
APPLICATION FILED JULY 30, 1917.
1,382,058.
Patented June 21, 1921.
7 SHEETS—SHEET 1.
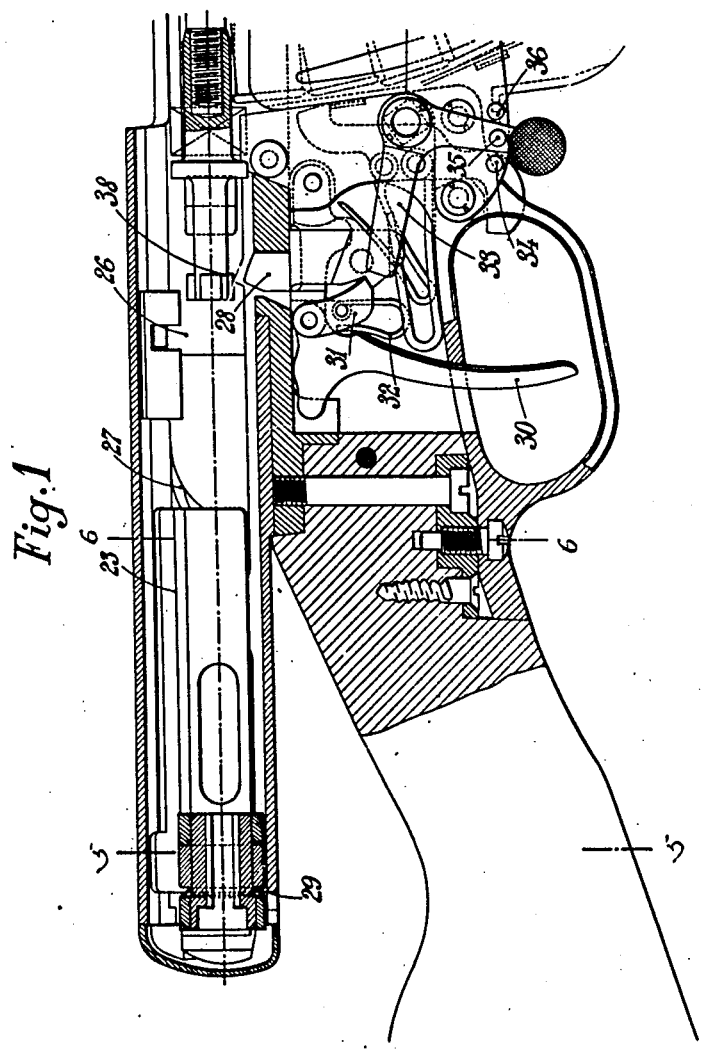
Inventor,
E. A. L. Bourdelles

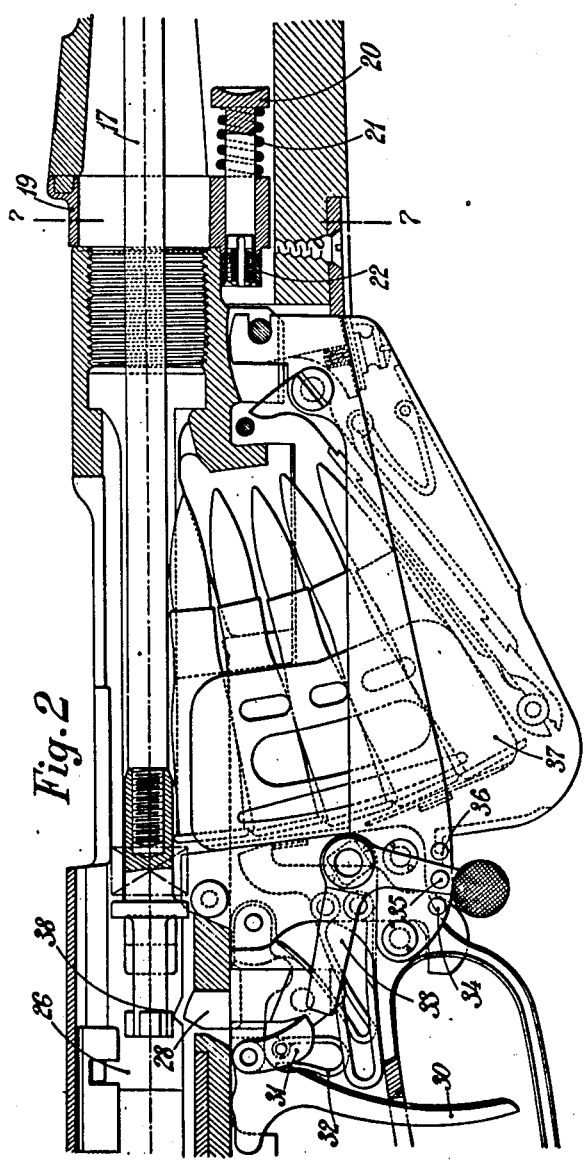

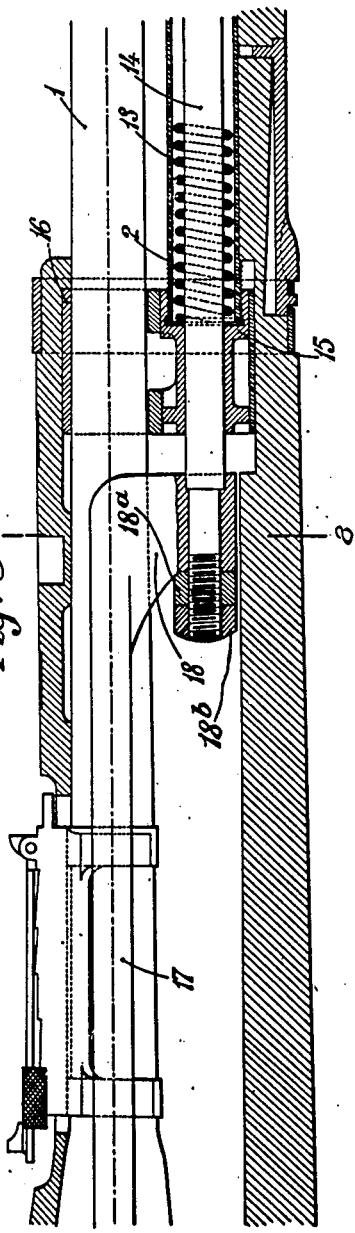
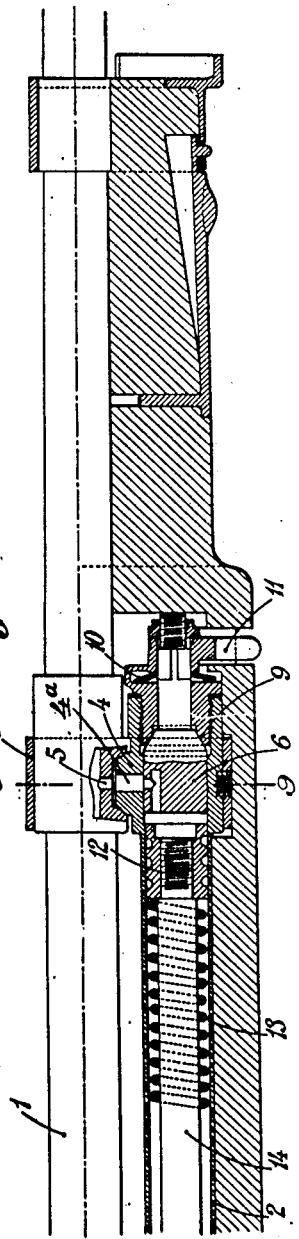

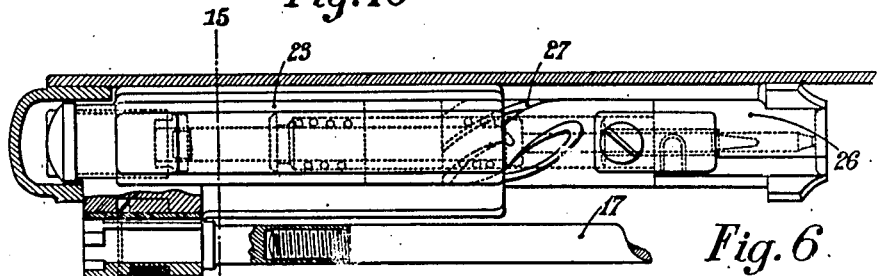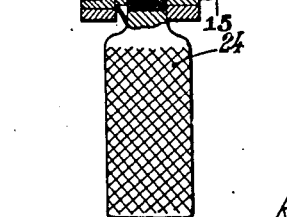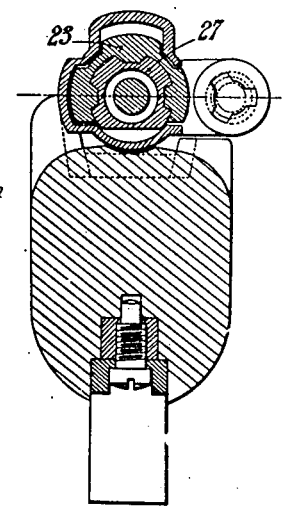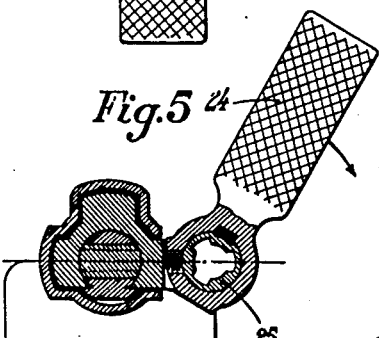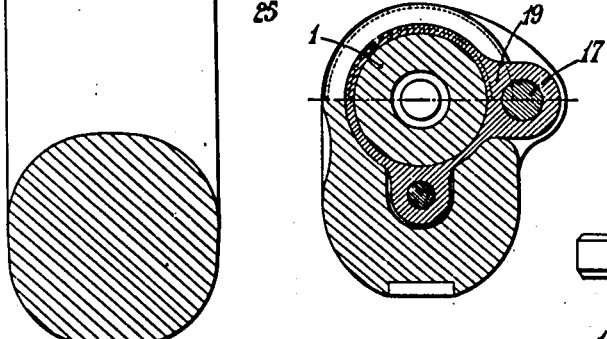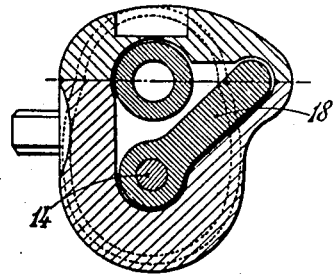

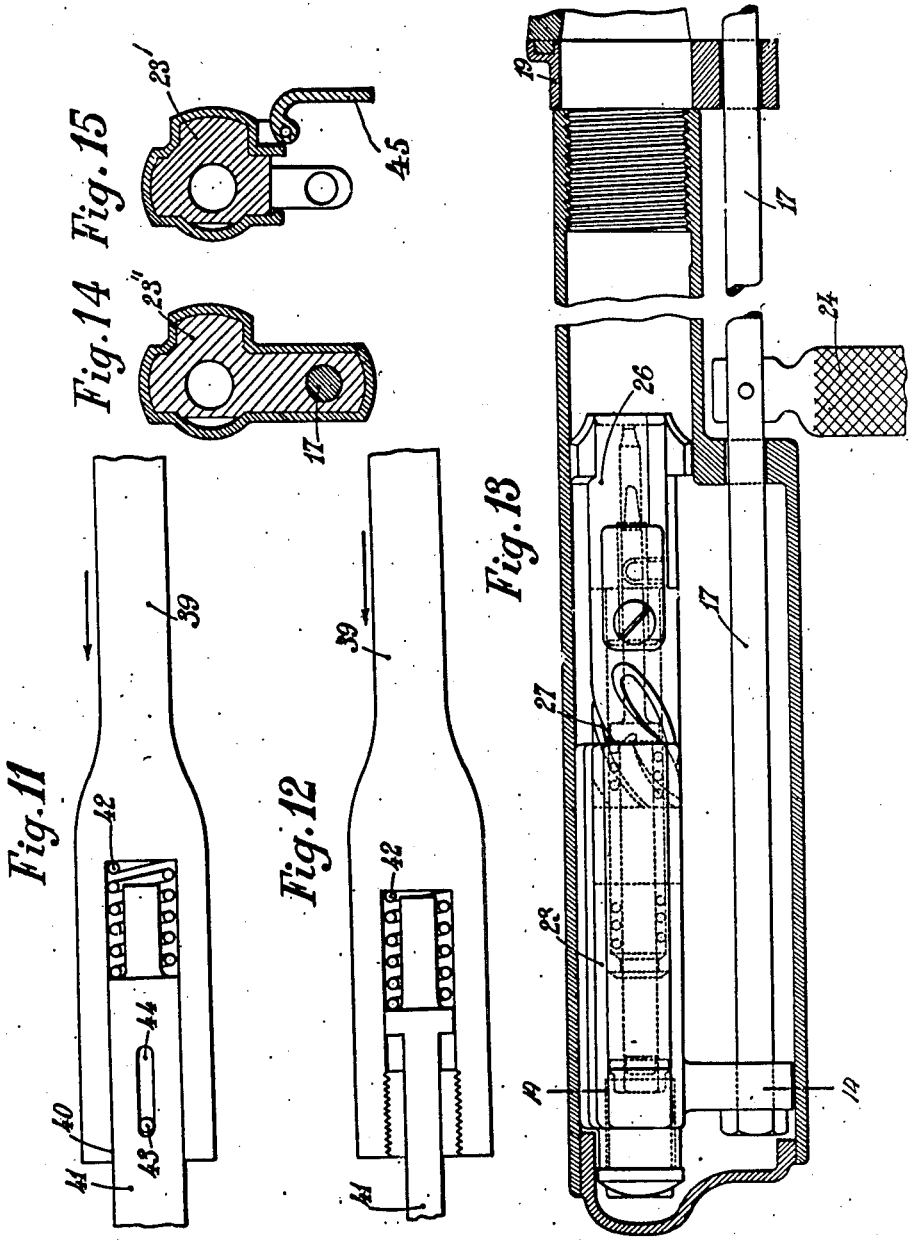

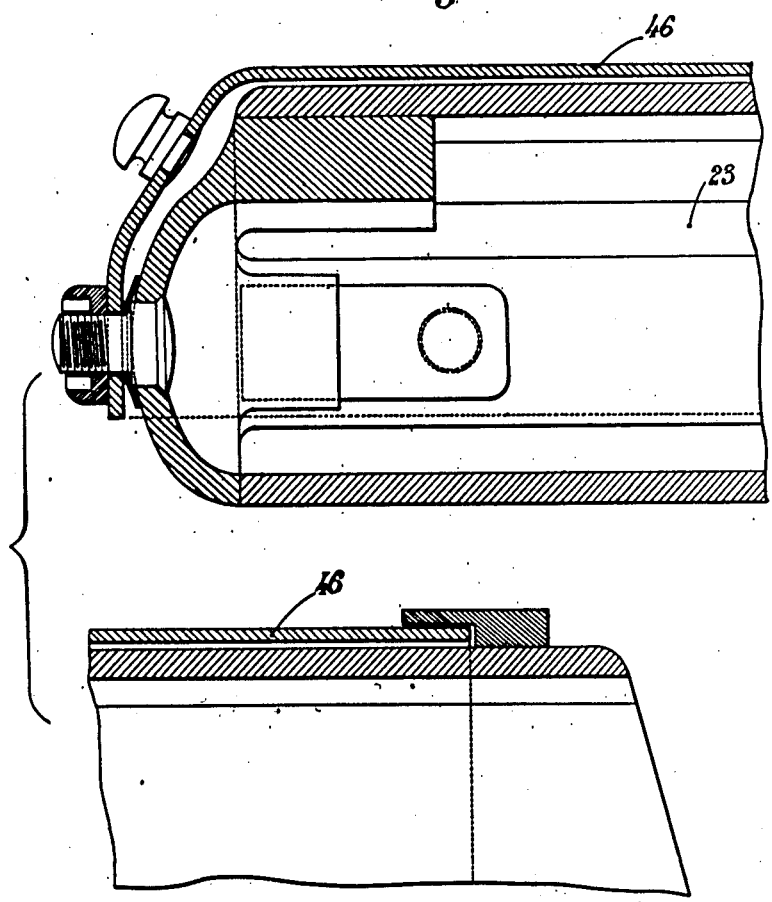

E. A. L. BOURDELLES.
AUTOMATIC FIREARM.
APPLICATION FILED JULY 30, 1917.
1,382,058.  Patented June 21, 1921.
7 SHEETS—SHEET 7.
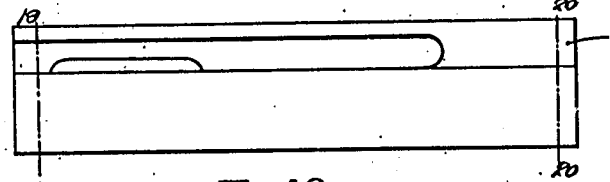
Fig. 17
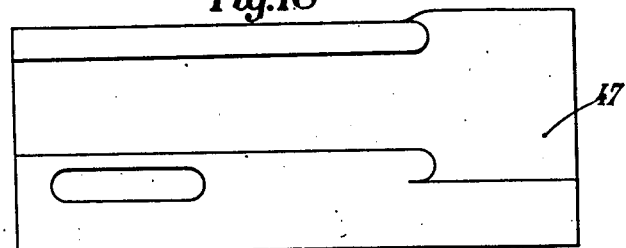
Fig. 18
Fig. 19  Fig. 20
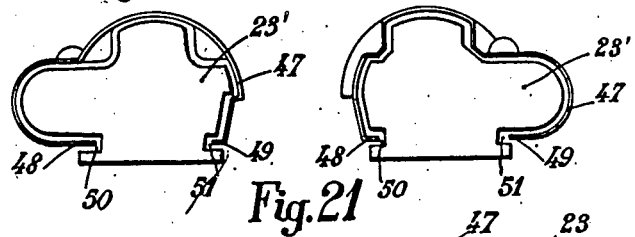
Fig. 21
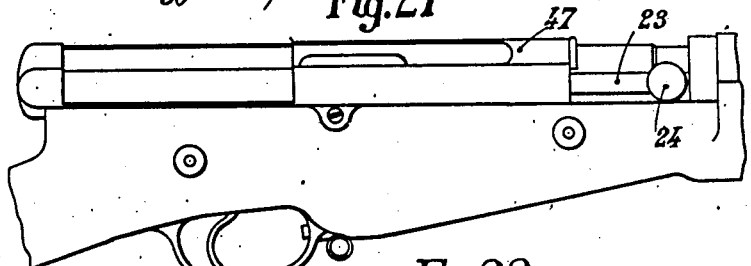
Fig. 22
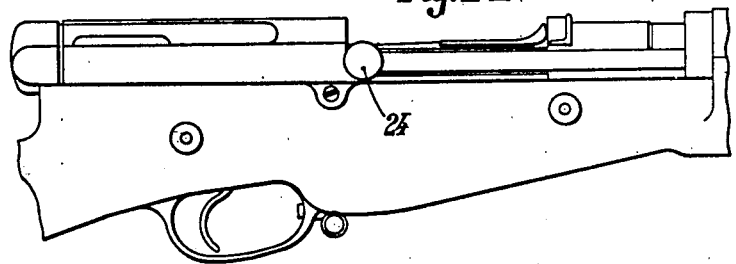
Inventor.
E. A. L. Bourdelles
by Lennie Goldsborough O'Neill
Attys.

UNITED STATES PATENT OFFICE.

EMILE ALEXANDRE LOUIS BOURDELLES, OF ST.-DENIS, FRANCE, ASSIGNOR TO SOCIETE ANONYME DES ETABLISSEMENTS DELAUNAY BELLEVILLE, OF ST.-DENIS, FRANCE, A CORPORATION OF FRANCE.

AUTOMATIC FIREARM.

1,382,058.  Specification of Letters Patent.  Patented June 21, 1921.

Application filed July 30, 1917. Serial No. 183,617.

*To all whom it may concern:*

Be it known that I, EMILE ALEXANDRE LOUIS BOURDELLES, of 1 Rue de l'Ermitage at St.-Denis, Department of the Seine, France, citizen of the French Republic, have invented certain new and useful Improvements in Automatic Firearms; and I do hereby declare the following to be a full, clear, and exact description of the invention, such as will enable others skilled in the art to which it appertains to make and use the same.

This invention relates to automatic fire arms in which the operation is effected by means of the gases of discharge acting on a piston contained in a cylinder situated below the weapon and connected thereto. The invention may also be applied to non-automatic small arms at present in use by transforming these into automatic rifles.

I will describe with reference to the accompanying drawings a construction in accordance with the present invention but I do not limit myself to the precise construction described and illustrated. The invention is shown as applied to a French rifle of the 1907 pattern but obviously its application is not limited to such type or pattern of weapon.

Figures 1, 2, 3 and 4 are side elevations, partly in section, of an automatic rifle in accordance with the present invention.

Fig. 5 is a cross section taken on the line 5—5 Fig. 1, of the back part of the rifle, and showing the means of freeing the lever-handle from the operating rod.

Fig. 6 is a cross section taken on the line 6—6 Fig. 1.

Fig. 7 is a cross section taken on the line 7—7 Fig. 2.

Fig. 8 is a cross section taken on the line 8—8 Fig. 3 and showing the means of connection of the operating rod to the gas operated piston.

Fig. 9 is a cross section taken on the line 9—9 Fig. 4 and showing the gas vent in the bore of the barrel and the variable orifice arrangement.

Fig. 10 is a plan, partly in section, of the middle part of the rifle.

Fig. 11 and Fig. 12 illustrate in section modifications of the operating rod.

Fig. 13 shows the back part of the breech, closed on the outside to prevent the entrance of dirt, mud or other injurious material.

Fig. 14 is a cross section taken on the line 14—14 Fig. 13, showing the complete closure of the breech.

Fig. 15 shows in section (line 15—15 of Fig. 10) another form of closure, capable of being opened and closed like a snuff-box by means of a movable cover or lid which is raised at the moment of firing.

Fig. 16 drawn to an enlarged scale shows another modification of the closure, by means of a hinged valve or shutter.

Fig. 17 is a side elevation of another modification of a cover in accordance with this invention.

Fig. 18 is a plan view.

Fig. 19 is a cross section taken on the line 19—19 of Fig. 17 as seen from the front.

Fig. 20 is a cross section taken on the line 20—20 of Fig. 17, as seen from the rear.

Fig. 21 is a side elevation of part of a rifle provided with the breech carrier in the closed position.

Fig. 22 shows the breech carrier pushed back into the firing position.

According to the invention, the barrel 1 supports a gas-cylinder 2 which serves as a propelling device, through the medium of a clamping ring 3 which secures the extremity of the gas cylinder 2 to the barrel 1.

The cylinder 2 carries a boss 4 adapted to fit gas tight into a seating in the barrel, which barrel is provided with a vent 5 through which the gases of discharge can pass.

The boss 4 is provided with a radially arranged passage 4ª which communicates with a plug 6, capable of occupying different positions in the gas chamber so as to enable the interior of the gas cylinder to be placed in communication with the bore of the barrel when desired through passages 7 and 8 of different diameters, in order to regulate the supply of gas.

The forward end of the plug 6 is beveled and is adapted to bear on a corresponding seating 9 the thrust being taken up by a Belleville washer 10 or a coiled spring. A lever-handle 11 is provided by means of which the plug 6 can be turned from the outside to put either the passage 7 or 8 into communication with the passage 4ᵃ and vent 5. The interior of the gas cylinder is provided with a piston 12 which when acted on by the gases of discharge compresses a helical spring 13 arranged in the cylinder and surrounding a rod 14, the heating effect of the barrel 1 on the spring being minimized by the gas cylinder casing.

The rod 14 extends beyond the rear end of the cylinder 2 and is supported in a bearing 15 secured to the rear end of the cylinder 2 and attached to the barrel 1 by a clamping ring 16 which maintains the bearing rigidly in position.

The rear end of the piston rod 14 is connected to a rod 17 by a bracket or post 18 and nut 18ᵃ, and a lock nut 18ᵇ.

The rod 17 passes through and is guided by a support 19 fixed to the barrel 1, which also supports a spring actuated plunger stop 22 having a head 20 between which and the support 19 the spring 21 is arranged. The tension on the spring can be adjusted by a nut. The plunger acts as a stop and serves to damp the supplementary travel of the piston, when the action of the gases of discharge is, in the case of certain shots, too strong.

The operating rod 17 may if desired be connected to the cylinder 23 of the movable breech part by means of three smooth sectors and three threaded sectors, which engage with three smooth sectors and three threaded sectors on the handle 24 connected to the cylinder 23 and by means of which the sectors can be engaged with or disengaged from the corresponding sectors when rotated in the direction of the arrow Fig. 5. The handle 24 is connected to the cylinder by two lugs and a keyed sleeve 25.

The reciprocating to-and-fro movements of the cylinder produce the rotary movement of the breech bolt 26 at the moment of closing or of opening by means of a screw thread 27 having a large pitch angle.

The engagement of the striker in the cocked position is effected, as usual, by a sear tooth 28 projecting into a suitable recess 29 in the tail of the striker.

The gun may be used for firing shot by shot, in spite of the action of the finger on the sear, or the weapon may be used as a machine gun, as well as for bringing about security of firing.

The trigger 30 actuates the sear 28 by means of a catch 31 against the action of the usual sear spring. The catch can be acted on by one arm 33 of a bell-crank lever which can be fixed in one or other of three different positions by means of a pin which engages in one or other of the holes 34, 35, 36.

If the pin be inserted into the hole 34, the arm 33 prevents the sear 28 from descending and thereby gives safety.

If the pin be inserted in the hole 35, as illustrated in Fig. 1, when the trigger 30 is pulled the catch 31 lowers the sear 28 and the shot is discharged, but at the same time it comes into contact with the extremity of the arm 33 which releases it and the sear rises under the action of its spring and thereby retains the striker when next it passes, in spite of the continued action of the finger on the trigger 30.

If the pin be inserted in the hole 36, the arm 33 is lowered from the position shown in Fig. 1 and the continued pressure of the finger on the trigger 30 keeps the sear 28 thrown back. The shots then succeed each other without interruption, as in a machine gun.

In the arrangement described above, the breech bolt closes between each shot by the action of the spring 13, the striker alone remaining behind, as it is retained by the sear 28. It is driven forward by its spring, of known form, located inside the breech bolt when the action of the finger on the trigger releases it.

When the magazine 37 is exhausted and it is desired to place another in position without having to overcome the thrust of the spring 13, the movable breech part is freed from the rod by raising the lever handle 24. The movable breech part can then be drawn backward, a new magazine inserted, and the breech can be closed by lowering the lever 24, which again connects the movable breech part to the operating rod 17.

Another constructional form enables this movement to be obviated while eliminating the notch 29 as well as the striker spring and fixing the tail of the striker to the cylinder 23 by any suitable means. All that is necessary in this case is to provide a notch 38 in the breech bolt 26, in which notch the tooth of the sear 28 can engage so as to stop the breech bolt in its rear position.

In this case, when the finger is pressed on the trigger, the spring 13 forces the rod 17 forward and at the same time causes the whole of the breech bolt to move forward which pushes the cartridge forward into position in the bore to be acted on by the striker, the striking action being effected during the last moments of the rotary closing movement of the movable head 26, during which period the cylinder 23 advances with respect to the front edge of the movable head.

Another constructional form enables the time of opening the breech to be delayed, in order to prevent the movable breech bolt from turning while there still remains a high pressure in the barrel.

To this end the operating rod 17 is divided into two parts Figs. 11 and 12 one part 39 being provided with an axial hole 40 into which the other part 41 of the rod enters.

Between the two parts of the rod a spring 42 is interposed, the tension of which is so adjusted that the rod acts first to compress the spring 42 and then drives the part 41 backward.

During the travel of the part 39 the pressure of the gases of discharge in the bore becomes reduced, and the rod acts by virtue of its kinetic energy for the remaining part of the movement for which it is intended.

The breech is returned by the part 41, by a pin 43 fixed to the part 39 which slides freely in a slot 44 in the part 41, Fig. 11. The thrust may be obtained by any other suitable means, such as a head on the part 41 acting against the rear of the part 39 as shown in Fig. 12.

The back part of the breech casing may, if preferred, be closed externally on the right, in order to prevent the access of dirt, mud or other injurious material as indicated in the sections in Figs. 13 and 14, the lever-handle being carried farther forward along the rod. It may also be closed like a snuff box, by means of a movable cover 45 which is raised at the moment of firing, Fig. 15, or by means of a movable valve 46, Fig. 16.

The operation of the mechanism is as follows: When the shot is fired, the gases of discharge passing through the vent 5 in the barrel and one of the holes 7 and 8 in the plug 6, act on the piston 12 and drive it backward, together with the operating rod 14, which, through the medium of the rod 17, pushes the cylinder 23 backward. The cylinder being incapable of rotating in consequence of the engagement of the external grooves with the breech box, effects by means of the helix 27, the rotation of the breech bolt 26. At the same time the striker is carried backward with respect to the movable head of the breech-closing mechanism and its spring is compressed. The striker tends to remain in its place because of the flats on the screw thread 27.

The rotation of the movable head being effected, the movable breech parts as a whole are returned to the back position as shown in the figure. The spring 18 then causes it to move forward again, forcing the cartridge along and inserting it into the bore. The striker remains engaged with the sear by means of the notch 29. The movable head of the breech-closing mechanism is engaged by its guides, and by its forward thrust effects the closure. The action of the finger on the trigger liberates the striker, which discharges the shot and the motion continues.

In the modification shown in Figs. 17, 18, 19, 20, 21 and 22 the breech cover 47 is preferably of the shape shown in Fig. 19 and surrounds the sliding cylinder 23' as shown. It is provided with two projections 48 and 49 which engage in grooves 50 and 51 in the breech casing. At the rear the cover is of the shape illustrated in Fig. 19 where it fits closely to the outline of the breech casing.

When the breech is closed as shown in Fig. 21, the protecting breech cover 47 is in the forward position and is returned by the gunner when the operating knob 24 of the movable breech part is drawn backward, the breech cover, then remaining in this position, Fig. 22, until the operating knob is again operated.

I claim:

1. In a gas operated automatic fire arm, a plug having a plurality of holes enabling the action of the gases of discharge to be increased or diminished, the said plug being capable of adjustment from the outside by means of a lever-handle passing out through the stock and arranged at right angles to the barrel in such position that it does not interfere with the fixing of the bayonet, said plug having a conical head, a seat for the head and a spring active to retain the conical head on its seat to form a gas tight joint.

2. In a gas-operated fire-arm having a gas-actuated operating piston, a resilient stop placed between the piston and the gun frame and adapted to be supported and guided in an extended portion of a ring-like member encircling the rear end of the barrel, said stop being arranged to damp the travel of the piston, and means for regulating the effectiveness of the stop.

3. In a gas-operated fire-arm having a gas-actuated operating piston, a ring-like member encircling the rear end of the barrel provided with a pair of radial extensions, one of said extensions forming an intermediate guide for the operating rod of said piston, and a spring stop placed between the piston and movable breech adapted to be guided and supported in the other extension of said ring-like member, said stop being arranged to damp the travel of the piston, and means for varying the tension of the spring.

4. In a gas operated automatic fire arm, means whereby safety, single shot and machine gun firing can be obtained, said means including a trigger, a sear, a catch interposed between the trigger and the sear, and an adjustable stop with which said catch is arranged to cooperate, the stop being capable of three positions, in one of which it rigidly fixes the sear, in the second of which it throws the catch back and in the third of which it is itself thrown back from the sear.

In testimony whereof I affix my signature, in presence of two witnesses.

EMILE ALEXANDRE LOUIS BOURDELLES.

Witnesses:
CHAS. P. PRESSLY,
ALEXANDRE BUTHALL.